United States Patent [19]

Greenspan et al.

[11] 3,880,895

[45] Apr. 29, 1975

[54] HYDROXYLATION OF D-13-ALKYL-17α-ETHYNYL-HYDROXY-GON-4-EN-3-ONE AND DERIVATURES THEREOF

[75] Inventors: George Greenspan, Narberth; Richard W. Rees, Bryn Mawr, both of Pa.

[73] Assignee: American Home Products Corporation, New York, N.Y.

[22] Filed: Oct. 16, 1973

[21] Appl. No.: 407,015

Related U.S. Application Data

[63] Continuation-in-part of Ser. No. 274,012, July 21, 1972, abandoned.

[52] U.S. Cl. ............ 260/397.4; 260/397.45; 195/51
[51] Int. Cl. .......................................... C07c 169/20
[58] Field of Search ..................... 260/397.4, 397.45

[56] References Cited

UNITED STATES PATENTS

| | | | |
|---|---|---|---|
| 3,297,687 | 1/1967 | Feldman et al. | 260/239.55 |
| 3,565,778 | 2/1971 | Jeger et al. | 204/158 |
| 3,574,197 | 4/1971 | Prezewowsky | 260/239.55 |

*Primary Examiner*—Elbert L. Roberts
*Attorney, Agent, or Firm*—Robert Wiser

[57] ABSTRACT

Incubation of d-13-methyl or ethyl-17α-ethynyl-17-hydroxygon-4-en-3-ones with the fungus Botryodiplodia malorum produces the corresponding 1β-hydroxy derivatives which have anti-estrogenic activity. The 13-methyl-β-hydroxy product is formed in admixture with the corresponding 11β-hydroxy compound.

4 Claims, No Drawings

HYDROXYLATION OF D-13-ALKYL-17α-ETHYNYL-HYDROXYGON-4-EN-3-ONE AND DERIVATURES THEREOF

CROSS REFERENCE TO RELATED APPLICATION

This application is a continuation-in-part of U.S. application Ser. No. 274,012, filed 21 July 1972, now abandoned.

BACKGROUND OF THE INVENTION

The 1β-hydroxylation of 19-nortestosterone and estr-4-ene-3,17-dione by *Botryodiplodia malorum* has been reported in the literature: Bolt et al., Rec. Trav. Chim. 84, 626 (1965); Brodie et al., Biochim. Biophys. Acta. 239, 103 (1971); Kim et al., J. Biol. Chem. 248, 2134 (1973). United States Patent 3,231,589 describes hydroxylation by *Aspergillus ochraceus* to produce l-1β-hydroxy, and d-11α-hydroxy-, 17α-ethynyl-gon-4-ene steroids. The present invention concerns the synthesis, using *B. malorum*, of d-1β-hydroxy-, and d-11β-hydroxy-, 17α-ethynyl-gon-4-ene steroids.

DESCRIPTION OF THE INVENTION

The invention sought to be patented in its first composition aspect resides in the concept of a compound having the structural formula:

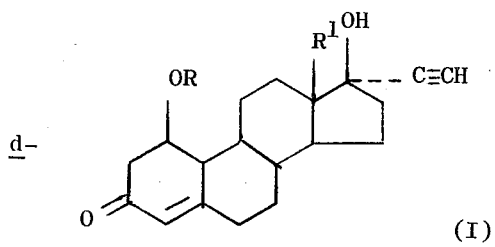

wherein R is hydrogen or acetyl and $R^1$ is methyl or ethyl.

The tangible embodiments of the first composition aspect of the invention are white crystalline solids and possess the inherent applied use characteristic of exerting an anti-estrogenic effect upon administration to warm-blooded animals.

The invention sought to be patented in a second composition aspect resides in the concept of a compound having the structural formula:

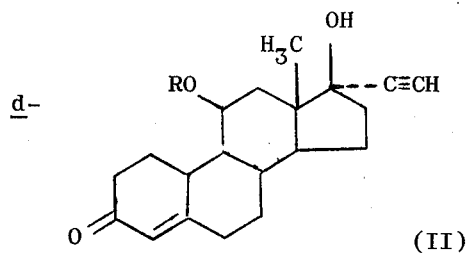

wherein R is hydrogen or acetyl.

The tangible embodiments of the second composition aspect of the invention are white crystalline solids and possess the inherent applied use characteristic of exerting an estrogenic effect upon administration to warm-blooded animals.

The invention sought to be patented in its first process aspect resides in the concept of a process for the preparation of a compound having the formula:

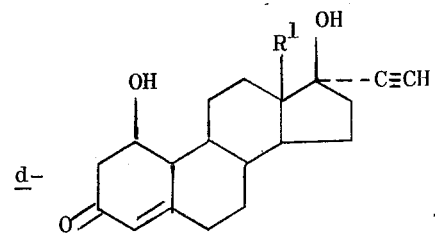

wherein $R^1$ is methyl or ethyl, which comprises contacting a compound having the formula:

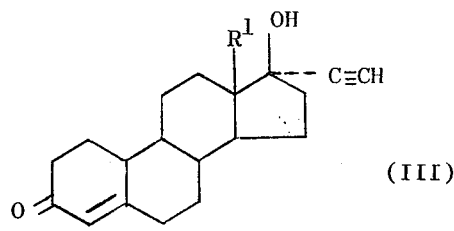

wherein R is methyl or ethyl, with the fungus *Botryodiplodia malorum*.

The invention sought to be patented in a second process aspect resides in the concept of a process for the preparation of d-19-nor-17α-ethynyl-11β,17β-dihydroxyandrost-4-en-3-one which comprises contacting d-19-nor-17α-ethynyl-17β-hydroxyandrost-4-en-3-one with the fungus *Botryodiplodia malorum*.

DESCRIPTION OF THE PREFERRED EMBODIMENTS

In a typical practice of the processes of the invention in the production of the compounds of the invention, mycelia of *Botryodiplodia malorum* are suspended in distilled water, and to this suspension is added the d-13β-alkyl-17α-ethynyl-17-hydroxygon-4-en-3-one in approximately 1 percent solution in ethanol. The suspension is then aerated and agitated for sufficient time to permit the desired conversion. The efficiency of conversion will, of course, vary with time of reaction, rate of agitation, and rate of aeration, but the optimization of these parameters is well within the skill of the art. After fermentation has proceded for the desired period of time, the mycelium is removed, for example by filtration, and the remainder of the suspension is extracted with an organic solvent, such as ethyl-acetate. The desired product may then be isolated from the solvent solution by various techniques such as chromatography.

Where, in the starting material of formula III, R is ethyl, the major product obtained is the 1β-hydroxylated compound of formula I. Where, in the starting material of formula III, R is methyl, the major product obtained is the 11β-hydroxylated compound of formula II in admixture with a lesser amount of 1β-hydroxylated compound of formula I.

Compounds of the invention of formulas I and II where R is acetyl are prepared from the corresponding compounds where R is hydrogen by treatment with a mild acetylating agent such as acetic anhydride in the presence of pyridine.

Where used in this specification and claims the term "d-" refers to absolute configuration and denotes the enantiomer of the "natural" series. It is to be noted that the microbiological hydroxylations of this invention occur with the d-enantiomer. If, as starting material, one uses a racemate instead of d-enantiomer, one can, of course, obtain the resolved d-compounds of the invention.

In employing the compounds of the first composition aspect of the invention to produce anti-estrogenic effect, the compounds may be administered either orally or parenterally. The amount of compound to be administered will vary depending on the route of administration, the particular animal involved, and the degree of response desired. Significant effects can be observed at a dose of 5 mg. per kg. body weight. In employing the compounds of the second composition aspect of the invention to produce an estrogenic effect, they may be administered most effectively subcutaneously. The amount of compound to be administered will vary depending on the particular animal involved and the degree of response desired. Significant results can be observed at a dose of 10 mg. per kg. body weight.

The following examples further illustrate the best mode contemplated by the inventors of carrying out their invention:

EXAMPLE 1 d-1$\beta$,17$\beta$-Dihydroxy-13$\beta$-Ethyl-17$\alpha$-Ethynyl-Gon-4-En-3-One Seven agar slants of *Botryodiplodia malorum* CBS 134.50 were each washed with 5 ml. of distilled water, and the cell suspensions were transferred to 7 one liter flasks each containing 200 ml. of the following medium:

| | |
|---|---|
| Corn Steep Liquor | 5.0 g. |
| Dextrose | 20.0 g. |
| Peptone | 20.0 g. |
| Distilled H$_2$O | 1000 ml. |

The medium was autoclaved for 20 inches at 121° C.

The flasks were incubated for 72 hours on a rotary shaker, 250 rpm., 2 inches diameter of rotation at 28° C. Mycelial transfers, 12 percent, were made to a 14 liter fermentor containing 8 liters of medium. Agitation was set at 150 rpm., aeration at 4 liters of air per minute and temperature at 28°.

After 24 hours of growth, the mycelium was filtered off and suspended in distilled water. The steroid, d-13$\beta$-ethyl-17$\alpha$-ethynyl-17-hydroxygon-4-en-3-one, 1.4 g., was dissolved in 160 ml. of ethanol and added. After 16 hrs. of incubation with agitation at 150 rpm. and aeration at 4 l./min., the agitation was increased to 250 rpm. and the aeration to 6 liters of air per minute. Twenty-four hours later, there was a further increase in agitation to 300 rpm. and of aeration to 8 liters of air per minute.

The fermentation was harvested at 71 hours. The mycelium was filtered off and washed with warm water. The water wash was combined with the filtrate and extracted with 6 liters of ethyl acetate. The solvent extract was washed with a saturated NaHCO$_3$ solution and then dried over Na$_2$SO$_4$. The solvent extract was brought down to dryness under reduced pressure and then dissolved in acetone. A total of 1.08 g. of crude material containing five products precipitated out of the solvent at room temperature.

The crude solids were dissolved in an ethanol-acetone (4:1) mixture, and the solution was applied to preparative TLC plates (Brinkmann, PLG, Silica Gel F-254). The plates were developed in a solvent system composed of CHCl$_3$ : EtOH : CH$_3$COCH$_3$ (8: 1: 1). The area containing the largest u-v absorbing zone was scraped from the plates and the product was eluted with EtOH : Acetone (1: 1). The solution was concentrated to dryness under reduced pressure, and the crude compound was dissolved in ethyl acetate.

Lowering the volume of the ethyl acetate solution under reduced pressure led to crystallization of the product, 632 mg. 620 mg. of the product were dissolved in acetone and treated with Norit A. The charcoal was filtered off, and 601 mg. of the product, d-1$\beta$,17$\beta$-dihydroxy-13$\beta$-ethyl-17$\alpha$-ethynyl-gon-4-en-3-one, was recrystallized from the solvent. The m.p. of the new compound was 246°–247°. Anal. Calcd. for C$_{21}$H$_{28}$O$_3$: C, 76.79; H, 8.59. Found C, 76.81; H, 8.77. UV $\lambda_{max}^{EtOH}$ 243 m$\mu$ ($\epsilon$= 15,010), $[\alpha]_D$ = −145.1 (CHCl$_3$:MeOH 1:1), NMR in CDCl$_3$: $\delta$ 0.95 (C–18a methyl protons, triplet J=7 cps), 2.50 (C–2 protons, doublet J=4.8 cps), 2.52 (ethynyl proton singlet), 4.40 (1$\alpha$-proton multiplet), 5.85 (C–4 proton singlet). IR in KBr: 3.05, 3.15, 3.50, 3.58, 6.05 and 6.15 $\mu$.

EXAMPLE 2 d-1$\beta$-Acetoxy-17$\beta$-Hydroxy-13$\beta$-Ethyl-17$\alpha$-Ethynyl-gon-4-En-3-One d-1$\beta$,17$\beta$-Dihydroxy-13$\beta$-ethyl-17$\alpha$-ethynylgon-4-en-3-one (90 mg.) was dissolved in 2 ml. of pyridine and 1.8 ml. of acetic anhydride and left overnight at room temperature. The solution was then concentrated in high vacuo and the residue crystallized from ether:-petroleum ether to give 80 mg. of crude material. Recrystallization of this sample from acetone:ether:petroleum ether gave 60 mg. of the title compound, m.p. 186°–187°. Anal. Calcd. for C$_{23}$H$_{30}$O$_4$: C, 74.56; H, 8.16. Found: C, 73.43; H, 8.43 $[\alpha]_D$ = −144.0 (c=1.15 in CHCl$_3$). IR in CHCl$_3$: 3.02, 3.50, 5.75, 5.98, 6.05 $\mu$. NMR in CDCl$_3$:$\delta$ 1.02 (C–18a methyl protons, triplet J=7 cps), 2.03 (acetoxy singlet), 2.60 (C–2 proton doublet, J=4 cps), 2.62 (ethynyl proton singlet), 5.61 (C–1 $\alpha$ proton multiplet), 5.98 (C–4 proton singlet).

EXAMPLE 3

Microbiological Hydroxylation of d-19-Nor-17$\alpha$-Ethynyl-17$\beta$-Hydroxyandrost-4-En-3-One and Recognition of Transformation Products An agar slant of *Botryodiplodia malorum* CBS 134.50 was washed with 5 ml. of distilled water and one-half of the resulting cell suspension was transferred to a 250 ml. flask with 50 ml. of the following medium:

| | |
|---|---|
| Corn Steep Liquor | 5.0 g. |
| Peptone | 20.0 g. |
| Dextrose | 20.0 g. |
| Distilled H$_2$O | 1000 ml. |

The medium was autoclaved for 20 minutes at 121° C.

The flask was incubated for 67 hours at 28° on a rotary shaker, 250 rpm., 2 inches diameter of rotation. A mycelial transfer, 5 ml., was made to a flask containing the same medium; the flask was incubated as above for 29 hours.

Ten mg. of d-19-nor-17$\alpha$-ethynyl-17$\alpha$-hydroxyandrost-4-en-3-one (Norethisterone), dissolved in 0.5 ml. of ethanol was added to the fermentation flask, which was incubated as described earlier. After 1 day of shaking, a 5 ml. mycelial sample was removed from the flask and equilibrated with one ml. of methyl iso-butyl ketone.

An aliquot of the solvent extract was spotted on a TLC plate, silica gel, Brinkmann F 254, and the plate was developed in a solvent system composed of chloroform-ethanol-acetone (8:1:1).

Examination of the plate under uv light, 2537 A, disclosed six uv quenching zones.

Duplicate samples of the fermentation were extracted with ethyl acetate. The dried residue from one extract was dissolved in 1 ml. of acetone and that from the second in 1 ml. of ethanol. The former solution was acidified with 5N HCl and the latter with 5N NaOH. Aliquots of the treated samples were spotted on a TLC plate and developed as detailed above. Examination of the plate under uv light showed that in each case a uv quenching zone had been eliminated. When the plate was sprayed with a 10 percent solution of phosphomolybdic acid in ethanol and heated to 110° C. for 2 minutes, new zones with the $R_f$ of ethynyl estradiol were apparent.

The $R_f$ of the uv quenching zone eliminated by treatment with acid and base was 0.46. This zone contained the 1β-hydroxylated product.

EXAMPLE 4

Microbiological Hydroxylation of d-19-Nor-17β-Ethynyl-17β-Hydroxyandrost-4-En-3-One Six agar slants of *Botryodiplodia malorum* CBS 134.50 were each washed with 5 ml. of distilled water and the cell suspensions were transferred to 6 one liter flasks each containing 200 ml. of the medium described in Example 3. The flasks were incubated for 67 hours at 28° on a rotary shaker, 250 rpm, 2 inches diameter of rotation. Mycelial transfers, 20 ml., were made to 30 one liter flasks containing 200 ml. of medium each, and the flasks were incubated as above.

After 77 hours of growth, 200 mg. of d-19-nor-17α-ethynyl-17β-hydroxyandrost-4-en-3-one dissolved in 4 ml. of ethanol were added to each flask. The flasks were returned to the rotary shaker for further incubation. Four days later, the flasks were harvested and the contents pooled and extracted three times with ethyl acetate. The extract was washed with saturated NaHCO₃ solution, dried over anhydrous Na₂SO₄ and concentrated to dryness in vacuo.

EXAMPLE 5 d-19-Nor-17α-Ethynyl-1β,17β-Dihydroxyandrost-4-En-3-One

The dried solvent extracts obtained from various shaken flask fermentations of 15.91 g. of d-19-nor-17α-ethynyl-17β-hydroxyandrost-4-en-3-one in the manner described in Example 4 were dissolved in acetone and streaked on PLC plates, Brinkmann F 254, 2 mm. thickness. The plates were developed repeatedly in the solvent system composed of chloroform-ethanol-acetone (8:1:1). An area containing both the desired product and the contiguous 11β-hydroxynorethisterone was removed from the plates, and the products were eluted with acetone:ethanol (1:1) and taken to dryness.

The mixture was dissolved in acetone and was streaked on TLC plates, Brinkmann F 254, 0.25 mm. thickness. The plates were developed as before and the desired product area was excised from the plates and eluted with acetone-ethanol (1:1). The solution was taken to dryness under reduced pressure to yield a light yellow foam, 1.341 g.

TLC examination of the foam disclosed the main product, a small amount of 11β-hydroxynorethisterone and two small, aromatic products. Repeated efforts at crystallization failed to eliminate the contaminating components.

Chromatography on Analtech TLC Uniplates, Silica Gel GF, 250 μ thickness, in a cyclohexane:ethyl acetate (1:1) system, separated the aromatic compounds from the new diols. The latter zone, still contaminated with a very small amount of 11β-hydroxy analog, was removed from the plates, eluted with acetone-ethanol (1:1), and the eluate was taken to dryness.

The solid material was recrystallized from ether to give 403 mg. of d-19-nor-17α-ethynyl-1β,17β-dihydroxyandrost-4-en-3-one (1β-Hydroxynorethisterone), m.p. 191°–193°. Recrystallization of the second crop gave 84 mg., m.p. 191°–193°.

The analytical sample had the following constants:
Anal. Calcd. for $C_{20}H_{26}O_3$ (314.41): C, 76.40; H, 8.34. Found: C, 76.11; H, 8.38. $UV\lambda_{max}^{alcohol}$ 242 mμ (ε=15,556); $\lambda_{max}^{0.066N\ NaOH}$ 242 mμ (ε=9,485) and 298 mμ (ε=2,961). $[\alpha]_D^{26}$ = −153.7°. [C=1.002 in CHCl₃:MeOH (1:1)].

NMR in CDCl₃: δ 0.93 (C–18 methyl proton singlet); 2.50 (C–2 proton doublet, J=4 cps.); 2.52 (ethynyl proton singlet); 4.45 (C–1α proton, multiplet), and 5.88 (C–4 proton singlet) ppm.

IR spectrum in KBR: 3.00, 3.44, 6.01, and 6.10 μ.

The mass spectrum showed a molecular ion at m/e 314 and a peak at 296 for the loss of H₂O.

EXAMPLE 6 d-1β-Acetoxy-19-Nor-17α-Ethynyl-17β-Hydroxyandrost-4-En-3-One d-17α-Ethynyl-1β,17β-dihydroxyandrost-4-en-3-one (33 mg.) was dissolved in 1 ml. of pyridine and 0.3 ml. of acetic anhydride and left at 5° C. overnight. The mixture was then vacuum evaporated, taken up in toluene and the above procedure repeated. The sample was then taken up in ethyl acetate, vacuum evaporated and then recrystallized from ether to yield 26.5 mg. of the title compound, m.p. 177°–180° C.

Anal. Calcd. for $C_{22}H_{28}O_4 \cdot \frac{1}{4} H_2O$ : C, 73.20; H, 7.96. Found: C, 73.05; H, 7.90. $[\alpha]_D$ = −135.8 (C=0.682 in CHCl₃).

The mass spectrum showed peaks at m/e (356) and m/e-HOAc (296).

IR in KBr: 2.90, 3.02, 3.40, 5.71, 6.00, and 6.10 μ.
NMR in CDCl₃: δ 0.91 (C–18 methyl proton singlet); 2.01 (acetoxy proton singlet); 2.55 (C–2 proton doublet, J=4 cps.); 2.57 (ethynyl proton singlet); 5.53 (C–1α proton multiplet); 5.88 (C–4 proton singlet) ppm.

EXAMPLE 7

Microbiological Hydroxylation of d-19-Nor-17α-Ethynyl-17β-Hydroxyandrost-4-En-3-One and Isolation of d-19-Nor-17α-Ethynyl-11β,17β-Dihydroxyandrost-4-En-3-One Seven agar slants of *B. malorum* CBS 134.50 were each washed with 5 ml. of distilled water, and the cell suspensions were transferred to 7 one liter flasks each containing 200 ml. of the medium described in Example 3. The flasks were incubated at 28° C. on a reciprocating shaker, 3½ inches stroke, 87 strokes per min. for 3 days. Mycelial transfers, 960 ml., were made to a 14 liter fermentor containing 8 liters of medium. Aeration was set at 4 liters of air per min., agitation at 150 rpm. and temperature at 28° C.

After 16.5 hours of growth, the aeration was increased to 6 liters of air per minute and the agitation to 200 rpm. Eight hours later, the mycelium was filtered and the cells were suspended in 8 liters of distilled water. The steriod, 1.6 g. of d-19-nor-17α-ethynyl-17β-hydroxyandrost-4-en-3-one dissolved in 80 ml. of ethanol, was added to the fermentor. After 16 hours of incubation, the aeration was increased to 8 liters of air per min. and the agitation to 250 rpm. The fermentation was continued for 8 more hours before harvesting.

The mycelium was filtered off, washed with hot water and the combined filtrate and wash were extracted with 4.5 liters of ethyl acetate. The solvent extract was washed with saturated $NaHCO_3$ solution and dried over anhydrous $Na_2SO_4$. The solution was concentrated to a small volume under reduced pressure and then streaked on PLC plates, Brinkmann F-254, 2 mm. thickness. The plates were developed as in Example 3 and the desired zone, $R_f$ 0.42, was excised and eluted in a mixture of ethanol-acetone (1:1). The extract was concentrated to dryness to give 1.23 g. of a mixture.

The mixture was dissolved in ethanol-acetone (1:1) and streaked on PLC plates which were developed as in Example 3, followed by development in $CHCl_3$. The primary zone, eluted with ethanol-acetone, was again shown to be a mixture. The concentrated solution was streaked on PLC plates which were developed in ethyl acetate-hexane. The primary zone was eluted with ethanol-acetone and the extract was taken to dryness under reduced pressure.

The concentrate was dissolved in ether-acetone and hexane was added to give a precipitate of 437 mg., m.p. 215°–218°. This material, 394 mg., was dissolved in acetone and treated with Darco, Grade S 51. The solvent was filtered off and concentrated to dryness. The concentrate was dissolved in ether-acetone, and hexane was added to give 333 mg. of d-19-nor-17α-ethynyl-11β,17β-dihydroxyandrost-4-en-3-one, (11β-hydroxynorethisterone), m.p. 223°–224°.

Anal. Calcd. for $C_{20}H_{26}O_3$: C, 76.40; H, 8.34. Found: C, 76.47; H, 8.38. $\lambda_{max}^{alcohol}$ 242 mμ (=15,635).

NMR in $d_6DMSO$: δ 1.00 (C-18 methyl proton singlet); 3.33 (ethynyl proton singlet); 4.18 (C-11α-proton multiplet); 5.90 (C-4 proton singlet) ppm.

$[\alpha]_D = -5.8$ ($CHCl_3$:MeOH, 1:1). The mass spectrum displayed peaks at 314 and 296.

EXAMPLE 8 d-11β-Acetoxy-19-Nor-17α-Ethynyl-17β-Hydroxyandrost-4-En-3-One d-19-Nor-17α-ethynyl-11β,17β-dihydroxyandrost-4-en-3-one (65 mg.) was dissolved in 2 ml. of pyridine and 1.8 ml. of acetic anhydride and left at room temperature overnight. Vacuum evaporation and crystallization from ether gave 38 mg. of the title compound, m.p. 215°–220° C. $[\alpha]_D = 0°$ ($CHCl_3$). The mass spectrum displayed the pertinent peaks at 356 and 296. NMR in $CDCl_3$: δ 1.05 (C-18 methyl proton singlet); 2.07 (acetoxy proton singlet); 2.62 (ethynyl proton singlet); 5.32 (C-11α-proton multiplet); 5.89 (C-4 proton singlet) ppm.

The subject matter which the applicants regard as their invention is particularly pointed out and distinctly claimed as follows:

1. A compound of the structure:

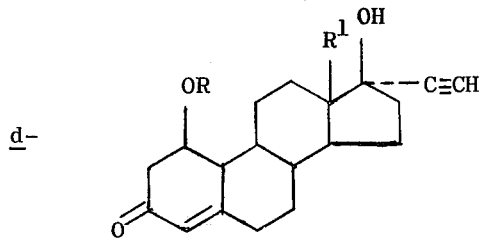

wherein R is hydrogen or acetyl and $R^1$ is methyl or ethyl.

2. The compound according to claim 1 wherein R is hydrogen and $R^1$ is ethyl.

3. The compound according to claim 1 wherein R is hydrogen and $R^1$ is methyl.

4. A compound of the structure:

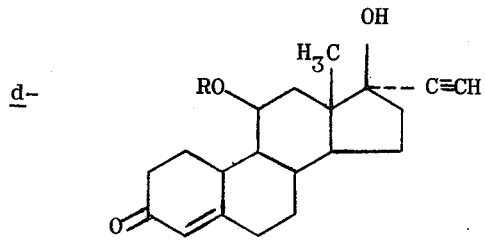

wherein R is hydrogen or acetyl.

* * * * *